(12) United States Patent
Weaver

(10) Patent No.: US 9,851,466 B2
(45) Date of Patent: Dec. 26, 2017

(54) GROUND SEARCH METAL DETECTOR ASSEMBLY

(71) Applicant: Brent C. Weaver, Heath, TX (US)

(72) Inventor: Brent C. Weaver, Heath, TX (US)

(73) Assignee: Garrett Electronics, Inc., Garland, TX (US)

( * ) Notice: Subject to any disclaimer, the term of this patent is extended or adjusted under 35 U.S.C. 154(b) by 61 days.

(21) Appl. No.: 15/132,806

(22) Filed: Apr. 19, 2016

(65) Prior Publication Data

US 2017/0299756 A1    Oct. 19, 2017

(51) Int. Cl.
*G01V 3/165*    (2006.01)

(52) U.S. Cl.
CPC .................... *G01V 3/165* (2013.01)

(58) Field of Classification Search
CPC .......... G01V 3/15; G01V 3/107; G01V 3/104; G01V 3/105; G01V 3/12
See application file for complete search history.

(56) References Cited

U.S. PATENT DOCUMENTS

| 3,662,255 | A |   | 5/1972  | Garrett |
|-----------|---|---|---------|---------|
| 3,753,185 | A |   | 8/1973  | Mahan   |
| 4,293,816 | A |   | 10/1981 | Johnson |
| 4,345,208 | A |   | 8/1982  | Wilson  |
| 4,797,618 | A | * | 1/1989  | De Vries .................. G01V 3/15 |
|           |   |   |         | 280/47.131 |
| 4,862,316 | A |   | 8/1989  | Smith et al. |
| 5,138,262 | A |   | 8/1992  | Podhrasky et al. |
| 5,680,048 | A |   | 10/1997 | Wollny  |
| 2014/0218036 | A1 |   | 8/2014 | Fry    |

* cited by examiner

*Primary Examiner* — Jermele M Hollington
*Assistant Examiner* — Suresh K Rajaputra
(74) *Attorney, Agent, or Firm* — Dan Brown Law Office; Daniel R. Brown

(57) ABSTRACT

A ground search metal detector with a pivotally mounted search coil that locates a stem connector at either of a storage position or an operational position. The operational position locates the connector adjacent to the central portion of the search coil to facilitate useful operational characteristics, and the storage position locates the connector adjacent to the perimeter edge to facilitate compact storage of the metal detector by pivoting the stem to overlap the search coil.

28 Claims, 5 Drawing Sheets

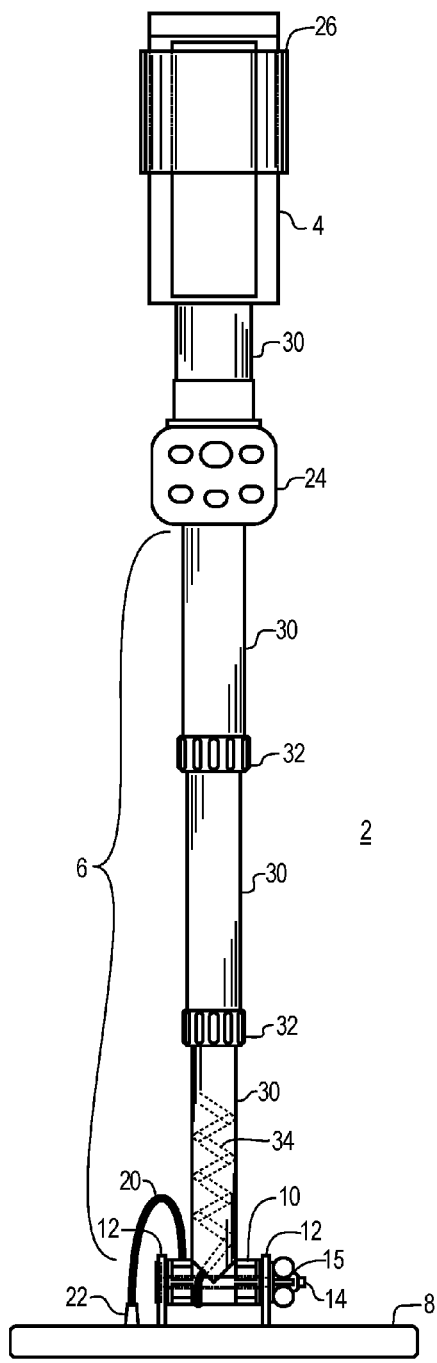
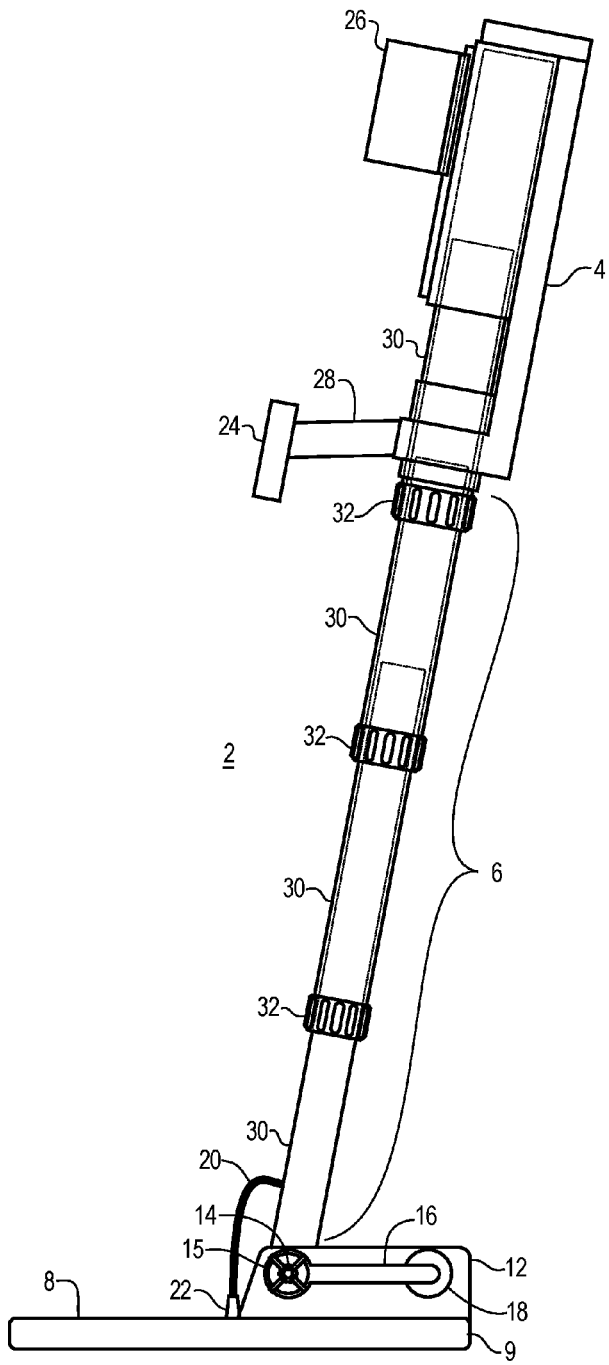
Fig. 2
Fig. 1

GROUND SEARCH METAL DETECTOR ASSEMBLY

BACKGROUND OF THE INVENTION

Field of the Invention

The present invention relates to metal detectors. More particularly, the present invention relates to ground search metal detectors that employ a swivel-mounted search coil and stem.

Description of the Related Art

Metal detectors are available in a range on configurations including walk-through metal detectors, handheld metal detectors, and ground search metal detectors. Ground search metal detectors are commonly utilized in hobby, commercial, government, and tactical applications. A ground search metal detector is commonly configured with a control assembly coupled to a stem, which is then coupled to a search coil. The control assembly includes the detection circuitry, displays, user actuators, battery, and interface connectors. The stem typically has a suitable length to enable the search coil to be swept adjacent to the ground while the user stands or walks, holding the stem and/or the control assembly. It is common to include a handgrip portion and an arm cuff portion that facilitate comfortable carrying and operation of the metal detector.

During operation of a ground search metal detector, the length of the stem must enable the search coil to reach the ground while the user stands comfortably. Of course, since users vary in height, and since the ground surface and search conditions vary as well, it is common to employ a stem that is adjustable in length. At any rate, in the extended position, the stem is rather long to accommodate a wide range of user physiology and search conditions. When the metal detector is not in use, and while it is packaged for storage and transportation, it is desirable to configure the components in the smallest reasonable proportions. The smallest storage configuration may require some disassembly of the metal detector, as is often seen in the case of commercial products as received new from the factory. The user may be required to assemble the newly received product. Although, users prefer that assembly is not required each time they elect to use the product.

Another feature found in ground search metal detectors is the use of a swiveled connection between the stem and the search coil. This allows the user to adjust the angle between the stem and a generally planar search coil to accommodate the geometry between the user's holding position, the stem angle, and the search coil angle with respect to the ground surface.

The location of the swivel connection between the stem and the search coil affects the operation and storage considerations discussed above. During operation it is desirable to have the stem connect to the search coil in a central location within the generally planar search coil, so that the forces on the coil are somewhat balanced, and also to facilitate the user's adjustment of the swivel angle by simply pressing the front or rear edge of the coil to the ground On the other hand, during storage of the search coil and stem combination, it is desirable to locate the swivel connection adjacent to the perimeter edge of the search coil, so as to enable the stem to fold over and overlap the entire longitudinal length of the search coil, and thereby present a smaller storage configuration. Considering the competing demands of operational configurations, storage configurations, as well as the user's desire for simple deployment, operation, and storage of the metal detector, it can be appreciated that there is a need in the art of the improved ground search metal detector assembly.

SUMMARY OF THE INVENTION

The need in the art is addressed by the apparatus of the present invention. The present disclosure teaches a metal detector that includes a stem with a connector located at a distal end thereof, and a search coil that has a generally planar configuration, which defines a perimeter edge and a central portion located away from the perimeter edge. A mount is disposed between the search coil and the connector, which pivotally engages and selectively locates the connector at either a storage position or an operational position. The operational position is located adjacent to the central portion, thereby facilitating balanced distribution of forces applied to the search coil with respect to the stem, and the storage position locates the connector adjacent to the perimeter edge to facilitate compact storage of the metal detector by pivoting the stem to overlap the search coil.

In a specific embodiment of the foregoing apparatus, the stem is collapsible, which reduces overall size of the metal detector for storage. In another embodiment, the stem is telescopic.

In a specific embodiment of the foregoing apparatus, the mount is an integral fixture of the search coil. In another embodiment, the mount removably engages the search coil.

In a specific embodiment, the foregoing apparatus further includes a brake disposed between the mount and the connector, thereby enabling selective control of the degree of force required to pivot the stem with respect to the search coil. In another specific embodiment, the apparatus further includes a latch disposed between the mount and the connector, and arranged to fixedly retain the connector at either the operational position or the storage position.

In a specific embodiment, the foregoing apparatus further includes a control cable extending from a control assembly to the search coil, and the control cable is routed along the stem and the mount to accommodate transitions between the operational position to the storage position. In a refinement to this embodiment, the cable is disposed within the stem. In another refinement, the cable is wrapped about the exterior of the stem.

In a specific embodiment of the foregoing apparatus, the mount is a clevis mount and the connector is a clevis knuckle. In another specific embodiment, the mount is a clevis mount and the connector is a clevis knuckle, where the clevis mount has a slot opening to engage a clevis pin passing through the clevis knuckle, and the slot opening ends define the operational position and the storage position. In a refinement to this embodiment, the mount further includes a recess formed about the slot opening that is aligned to retain the clevis knuckle in either the operational position or the storage position.

In a specific embodiment of the foregoing apparatus, the mount is rotatably coupled to the search coil about an axis of rotation, and rotation of the mount with respect to the search coil transitions the connector between the operational position and the storage position. In a refinement to this, the embodiment further includes a latch disposed to fixedly locate the mount at either the operational position or the storage position. In another refinement to this embodiment, the axis of rotation is oriented parallel to the substantially planar search coil. In another refinement to this embodiment, the axis of rotation is oriented perpendicular to the substantially planar search coil.

The present disclosure teaches a metal detector that includes a control assembly coupled to a stem that has a connector located at a distal end thereof, and a search coil with a generally planar configuration that defines a perimeter edge and a longitudinal axis. A mount is disposed between the search coil and the connector, and pivotally engages and selectively locates the connector at a first position or a second position. The first position locates the connector adjacent to the perimeter edge to facilitate compact storage of the metal detector by pivoting the stem to overlap substantially the entire length of the search coil longitudinal axis. The second position locates the connector proximate to the center of the search coil longitudinal axis.

In a specific embodiment of the foregoing apparatus, the mount removably engages the search coil. In another specific embodiment, the metal detector further includes a brake disposed between the mount and the connector, thereby enabling selective control of the degree of force required to pivot the connector with respect to the search coil.

In a specific embodiment, the foregoing apparatus further includes a latch disposed between the mount and the search coil, and arranged to fixedly retain the connector at either the first position or the second position.

In a specific embodiment of the foregoing apparatus, the mount is a clevis mount and the connector is a clevis knuckle. In another specific embodiment, the mount is a clevis mount and the connector is a clevis knuckle, and, the clevis mount has a slot opening to engage a clevis pin passing through the clevis knuckle, such that the slot opening ends define the first position and the second position. In a refinement to this embodiment, the mount further includes a recess formed about the slot opening and aligned to retain the clevis knuckle in either the first position or the second position.

In a specific embodiment of the foregoing apparatus, the mount is rotatably coupled to the search coil about an axis of rotation, where rotation of the mount with respect to the search coil transitions the connector between the first position and the second position. In a refinement to this embodiment, a latch is disposed to fixedly locate the rotatably coupled mount at either the first position or the second position. In another refinement, the axis of rotation is oriented parallel to the substantially planar search coil. In another refinement, the axis of rotation is oriented perpendicular to the substantially planar search coil.

BRIEF DESCRIPTION OF THE DRAWINGS

FIG. 1 is a front view drawing of a ground search metal detector according to an illustrative embodiment of the present invention.

FIG. 2 is a side view drawing of a ground search metal detector according to an illustrative embodiment of the present invention.

DESCRIPTION OF THE INVENTION

Figure 3:
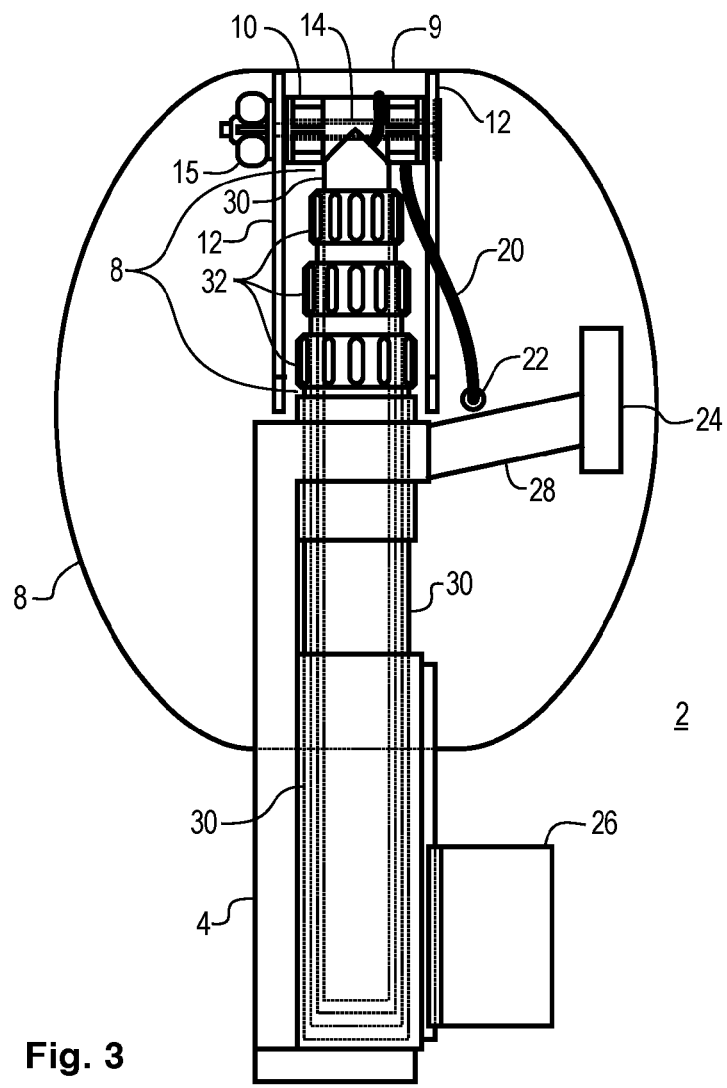
FIG. 3 is a top view drawing of a folded ground search metal detector according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Ground search metal detectors generally include a control assembly, a stem, and a search coil. It is known to utilize stems that are fixed in length, as well as stems that are adjustable in length. Adjustable length stems may comprise telescopic tubular sections, or may be collapsible through some other mechanism. The search coil is coupled to a distal end of the stem, typically with a pivoting connection so that the angular relationship between the stem and a longitudinal axis of the search coil can be adjusted.

The search coil is an assembly that comprises an electromagnetic coil and a protective housing. In addition, the search coil may include a cable connection and a mechanical member adapted to engage the distal end of the stem. There are various types of electromagnetic coils disposed within search coils, including single and plural coil configurations. The electromagnetic coils may be concentric, overlap, or offset from one another. The shape of the electromagnetic coils may be round, oval, or irregular in shape. Although, the vast majority of search coils are generally planar in configuration, so that coil can be placed directly adjacent to flat ground. The search coil housing encloses the electromagnetic coil to support and protect it. Thus, the search coil housing is also generally planar in configuration, and also sized to enclose the electromagnetic coil, without unduly increasing size or bulk of the search coil assembly. A longitudinal axis of the search coil aligns with the central axis of the stem, where the axis of pivot between the stem and the search coil is perpendicular to these axes.

As was discussed hereinbefore, the location of the pivoting connection between the stem and the search coil is a matter of design choice with significant trade-offs. These trade-offs generally affect operational use of the metal detector and storage or transportation aspects of the unit. The present disclosure teaches a novel mount arrangement whereby certain undesirable aspects of these trade-offs are mitigated. The present disclosure teaches a mount design that provides at least two positions where the stem has a pivoting attachment to the search coil. A first one of these positions, located toward the rear of the search coil, (i.e. the end of the search coil normally closest to the operator), places that connection adjacent to the perimeter edge of the search coil. This arrangement allows the full length of the search coil to fold back onto the stem, to thereby achieve near minimal dimensions for storage and transport.

A second mount position is located in the central area of the search coil (i.e. along the longitudinal axis of the search coil away from the perimeter edge, and optimally at the center of the longitudinal axis) to thereby provide more efficient operational characteristics of the search coil due to its non-rear mounted position. Rear mounted coils are beneficial for equipment collapsibility, but have operational disadvantages, such as awkward pivot angle adjustment using the operator's foot, hand, or a shovel. Also, the search coil is supported in a cantilever arrangement that places higher stress on the pivot brake, so the search coil tends droop over time due to coil's center of gravity being substantially forward of pivot point. In contrast, the more central-mounted position provides excellent operational features, including simple and efficient pivoting of the search coil angle by simply pressing the tip or the tail of the search coil to the ground. The central area mount is also closer to the search coil center of gravity, thereby reducing the stress and torque on the pivot braking system, as well as reducing or even eliminating search coil droop.

Reference is directed to FIG. 1 and FIG. 2, which are a front view drawing and side view drawing, respectively, of a ground search metal detector 2 according to an illustrative embodiment of the present invention. In these views, the metal detector 2 is configured in the operational mode, with a telescopic stem 6 extended for ground search operation. The metal detector 2 is comprised of a control assembly 4, which includes an arm cuff 26, a hand grip 28, and a user control panel 24, as are known to those skilled in the art. A telescoping stem 6 extends from the control assembly 4, and is comprised of plural telescoping tube sections 30 that are fitted together with compression locking nuts 32, which enables the user to adjust the stem 6 to any desired length. At the distal end of the stem 6, a search coil 8 is pivotally coupled to a clevis knuckle 10 fixed to the distal end of the stem 6. A clevis bolt 14 pivotally joins the clevis knuckle 10 to a pair of clevis flanges 12 that are molded together with the search coil 8 housing. A hand nut 15 is placed on the clevis bolt 14 to enable the user to adjust the degree of compression, and hence the degree of braking between the stem 6 and the search coil 8.

The clevis flanges 12 in FIGS. 1 and 2 present slotted openings 16 through which the clevis bolt 14 passes. In this manner, the clevis knuckle 10 at the distal end of the stem 8 can be located anywhere along the length of the slots 16 that the user desires. Although, recesses 18 are provided at both ends of the slot 16, so that the clevis bolt 14 and hand nut 15 naturally settle in the recesses 18 at both ends of the slots 16. With this arrangement, the clevis knuckle 10 can be located adjacent to the perimeter 9 of the search coil 8, or near the central portion of the search coil 8, as illustrated in FIGS. 1 and 2. The illustrative embodiment also includes a cable 20, which electrically couples the search coil 8 to the control assembly 4. In this embodiment, the cable enters the search coil through a gland seal 22. The cable 20 is also routed along a groove in the clevis knuckle 10 and enters the interior of the telescoping tubes 30, where a coiled portion 34 of the cable accommodates the varying length of the stem 6.

Figure 4:
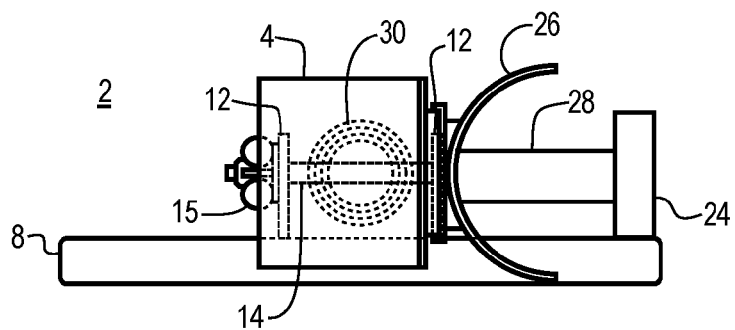
FIG. 4 is an end view drawing of a folded ground search metal detector according to an illustrative embodiment of the present invention.

Reference is directed to FIG. 3 and FIG. 4, which are a top view drawing and an end view drawing, respectively, of a folded ground search metal detector 2 according to an illustrative embodiment of the present invention. The metal detector 2 in these figures corresponds to FIGS. 1 and 2. In FIGS. 3 and 4, the metal detector 2 is configured in the storage position. In the storage position, the stem 8 sections 30 are compressed together to their shortest length. The clevis knuckle 10 has been slid along the clevis flange 12 slots toward the perimeter edge 9 of the search coil 8, which is to the rear end of the slots (not visible in these views). In this manner, the entire longitudinal length of the search coil 8 overlaps the length of the stem 8, and even a portion of the control assembly 4. Note also that the control assembly 4 has been rotated ninety degrees with respect to the clevis knuckle 10 such that the hand grip 28 and control panel 24 are reduced in overall dimension as well. This configuration presents the most compact overall dimensions of the metal detector 2 for storage and transport.

Figure 5:
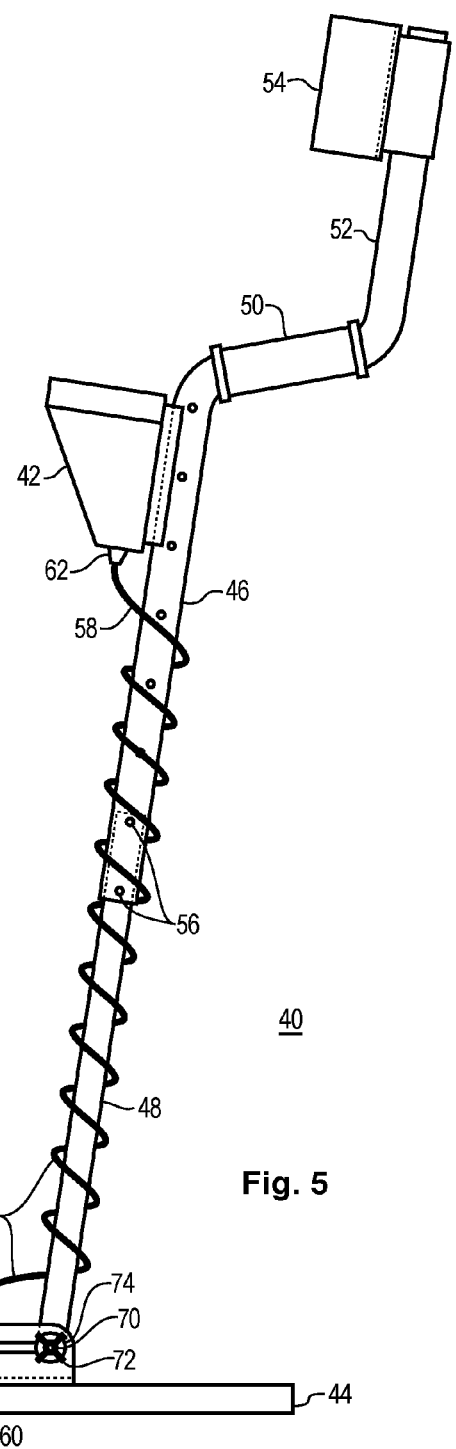
FIG. 5 is a side view drawing of a ground search metal detector according to an illustrative embodiment of the present invention.

Reference is directed to FIG. 5, which is a side view drawing of a ground search metal detector 40 according to an illustrative embodiment of the present invention. This illustrative embodiment includes a control assembly 42 attached to an upper section of collapsible stem 46. A lower section of collapsible stem 48 slidably engages the upper section 46, and can be retained at various lengths with spring loaded lock buttons 56, as are known to those skilled in the art. The upper section 46 is formed through a padded handgrip 50 and continues along a stem extension 52 to support an arm cuff 54. This configuration provides a comfortable user interface, which is built using lower cost materials.

The lower stem section 48 in FIG. 5 is terminated at its distal end with a clevis knuckle (not visible in this view). The clevis knuckle 74 is retained between a pair of clevis flanges 64 using a clevis bolt 70 and hand nut 72. Note that in this embodiment, the clevis flanges 64 are removably fastened to the search coil 44. The clevis flanges 64 provide slotted openings 66 through which the clevis bolt 70 passes. Locating recesses 68 are provided to retain the clevis bolt 70 at either end of the slots 66. Note that the slots 66 extend from the perimeter edge 45 to the center of the longitudinal length of the search coil 44. A cable 58 is connected between the search coil 44 and the control assembly 42. The cable passes through a gland seal 60 in the search coil 44, and is wrapped about the exterior of the stems sections 48, 46. The cable 58 attaches to an electrical connector 62 where it enters the control assembly 42.

Figure 6:
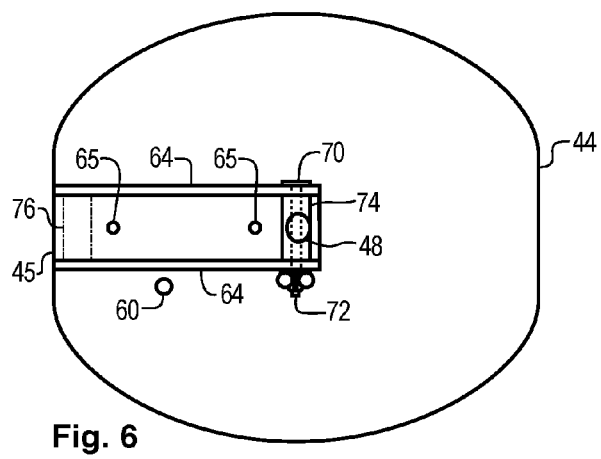
FIG. 6 is a top view drawing of a search coil for a ground search metal detector according to an illustrative embodiment of the present invention.

Reference is directed to FIG. 6, which is a top view drawing of a search coil 44 for a ground search metal detector according to an illustrative embodiment of the present invention. FIG. 6 corresponds to FIGS. 5 and 7. In FIG. 6, the clevis flanges 64 are presented. Note that in this embodiment, the clevis flanges 64 are formed as two legs of a C-channel, which is fastened to the search coil 44 using suitable fasteners 65. The cable gland seal 60 is visible to the side of the clevis flange 64. In this view, the clevis knuckle 74 is seen, with the location of the lower stem section 48 shown for the viewer's reference. Not that in this view, the clevis knuckle 74 is slid within the slotted openings (not visible in this view) all the way toward the central portion of the search coil, which is the operational position in this embodiment. The location that the clevis knuckle would reach at the opposite end of the slots is shown in phantom 76, which is the position adjacent to the perimeter 45 of the search coil 44. The location adjacent to the perimeter means that the clevis knuckle is positioned as close to the perimeter edge 45 as is practicable given the reasonable constraints of material thicknesses and strengths. The location within the central portion means that the clevis knuckle is located away from the perimeter edge a sufficient distance to gain meaningful benefits in the balance and operation of the search coil and stem combination. The central region may account for approximately two thirds of the area of the search coil's planar surface area, which is furthest away from the perimeter edge.

Figure 7:
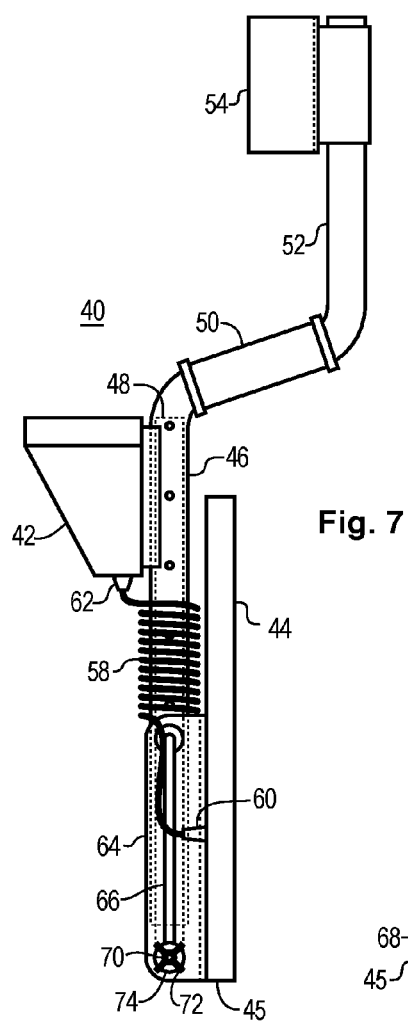
FIG. 7 is a side view drawing of a folded ground search metal detector according to an illustrative embodiment of the present invention.

Reference is directed to FIG. 7, which is a side view drawing of a folded ground search metal detector 40 according to an illustrative embodiment of the present invention. FIG. 7 corresponds to FIGS. 5 and 6. In FIG. 7, the clevis knuckle 74 (not visible in this view) is slid to the storage position, adjacent to the perimeter edge 45 of the search coil 44. In this view, the stem length is collapsed to a minimum. This arrangement enables the entire longitudinal length of the search coil to overlap with the stem sections 48, 46, thereby presenting the smallest overall dimensions of the metal detector 40 for storage and travel. The cable 58 remains wrapped about the upper and lower stem section 46, 48, albeit with the wraps pressed closer together.

Figure 8:
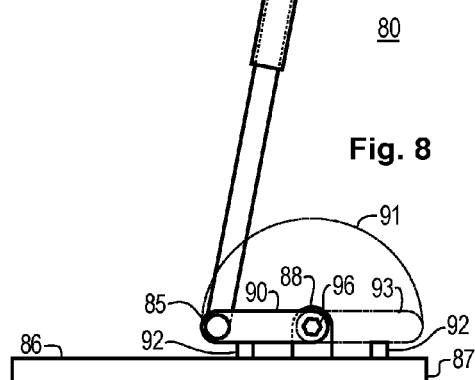
FIG. 8 is a side view drawing of a ground search metal detector according to an illustrative embodiment of the present invention.

Reference is directed to FIG. 8, which is a side view drawing of a ground search metal 80 detector according to an illustrative embodiment of the present invention. This embodiment presents a mount assembly that locates the distal end of the stem at both of a storage position and an operational position using a rotatably coupled mount. The metal detector includes a control assembly 82 and stem 84, which is telescopic in this embodiment, although various types of stems could be employed. The distal end of the stem 84 is terminated with a connector 85 (not visible in this view) that is rotatably coupled to a pair of links 90 that are further rotatably coupled to a pair of mounting flanges 88 that are fixed to a search coil 86. The pair of links 90 are coupled to the pair of flanges 88 using a suitable fastener 96, such as bolts, washers, and nuts, as are known to those skilled in the art. The pair of links 90 are thusly enables to rotate through 180° as indicated by phantom line 91 in the drawing figure. Note that in this view, the stem is located in the operational position by the pair of links 90, which places the distal end of the stem 84 near the central portion of the search coil 86. The location of the links 90 in the storage position is illustrated in phantom 93 in the drawing figure. In addition, suitable latches 92 are provided to retain the links 92 and stem 84 in either of the storage or operational positions.

Figure 9:
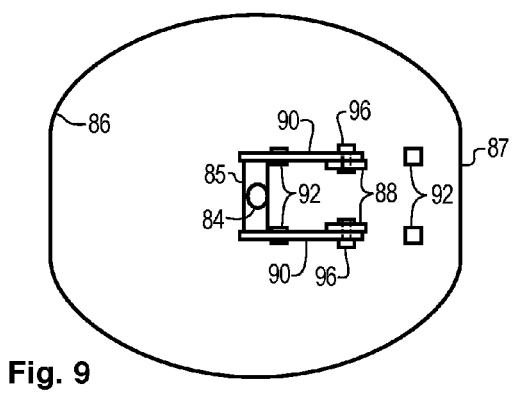
FIG. 9 is a top view drawing of a search coil for a ground search metal detector according to an illustrative embodiment of the present invention.

Reference is directed to FIG. 9, which is a top view drawing of a search coil 86 for a ground search metal detector according to an illustrative embodiment of the present invention. FIG. 9 corresponds to FIG. 8. In FIG. 9, the mounting flanges 88 are shown, and are located midway between the perimeter edge 87 and the center of the search coil 86, along its longitudinal axis. Thus, as the links 90 are rotated, they located the connector 85 and the stem 84 at either of the storage position adjacent to the perimeter edge 87 (not illustrated in this view) or the central portion of the search coil 86, as illustrated in this FIG. 9. In this view, there are four latches 92 illustrated, which serve to retain the links 90 at the desired positions. Note that the latches are shown schematically in this view. Those skilled in the art will appreciate that various latch mechanisms could be employed and that all four locations may not be required. A single latch could be employed, for example. The latches need not engage the links 90, but could also engages other components of the assembly.

Figure 10:
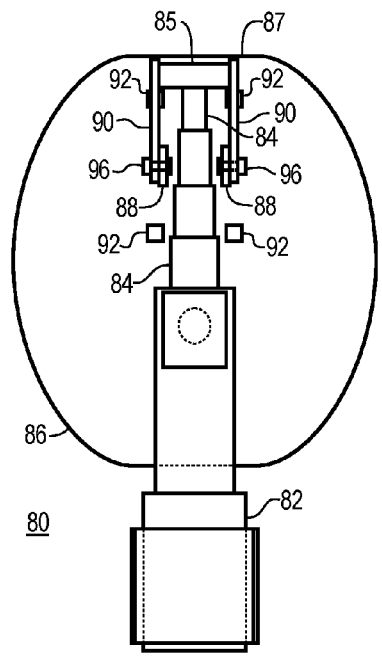
FIG. 10 is a top view drawing of a folded ground search metal detector according to an illustrative embodiment of the present invention.
Figure 11:
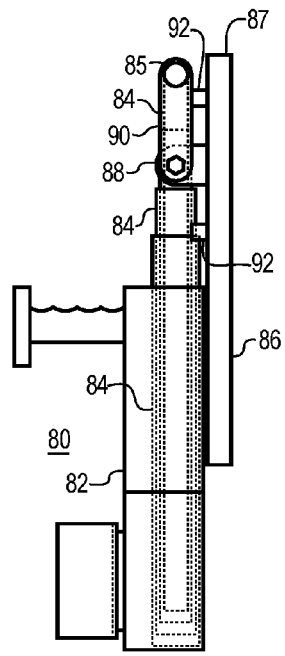
FIG. 11 is a side view drawing of a folded ground search metal detector according to an illustrative embodiment of the present invention.
Figure 12:
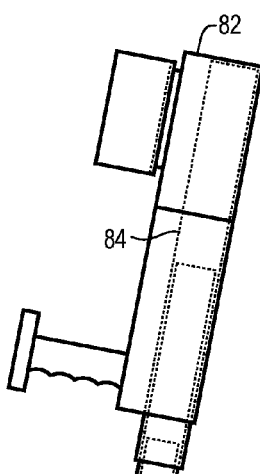
FIG. 12 is an end view drawing of a folded ground search metal detector according to an illustrative embodiment of the present invention.

Reference is directed to FIGS. 10, 11, and 12, which are top view, side view, and end view drawings, respectively, of a folded ground search metal detector 80 according to an illustrative embodiment of the present invention. In these views, the links 90 have been rotated to locate the connector 85 and the distal end of the stem 84 to be adjacent to the perimeter edge 87 of the search coil 86. The stem 84 has also been fully collapsed. From these views, it can be appreciated that the spacing between the pairs of mounting flanges 88, rotatable links 90, and latches 92 are selected to enable the stem to fit there between while the metal detector 80 is folded into the storage and transportation configuration. Note that the axis of rotation of the links 90 is parallel to the substantially planar search coil 86.

Figure 13:
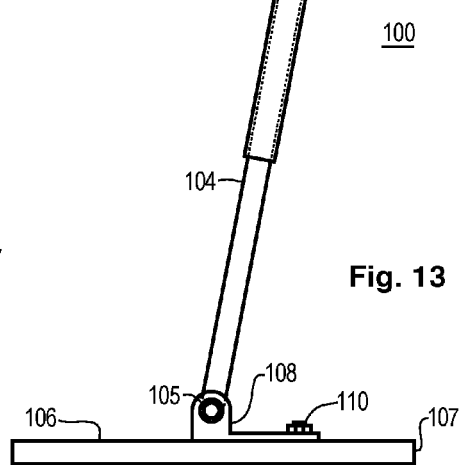
FIG. 13 is a side view drawing of a ground search metal detector according to an illustrative embodiment of the present invention.

Reference is directed to FIG. 13, which is a side view drawing of a ground search metal 100 detector according to an illustrative embodiment of the present invention. This embodiment presents a mount assembly that locates the distal end of the stem at both a storage position and an operational position using a rotatably coupled mount. The metal detector includes a control assembly 102 and stem 104, which is telescopic in this embodiment, although various types of stems could be employed. The distal end of the stem 104 is terminated with a connector 105 (not visible in this view) that is rotatably coupled to a rotatable bracket 108, which is further rotatably coupled to a search coil 106. The rotatable bracket 108 is rotatably coupled to the search coil 106 using a suitable fastener 110, such as a bolt and washers, or other fastening means that are known to those skilled in the art. The rotatable bracket 108 thusly enables rotation of the connector 105 and stem 104 through 180° about a vertical axis that is perpendicular to the planar search coil 106, as indicated by phantom line 111 in drawing FIG. 14 (discussed below). Note that in this view, the stem is located in the operational position by the rotatable bracket 108, which places the distal end of the stem 104 near the central portion of the search coil 106.

Figure 14:
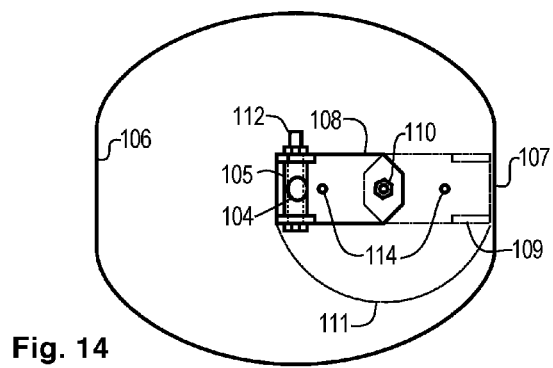
FIG. 14 is a top view drawing of a search coil for a ground search metal detector according to an illustrative embodiment of the present invention.

Reference is directed to FIG. 14, which is a top view drawing of a search coil 106 for a ground search metal detector according to an illustrative embodiment of the present invention. FIG. 14 corresponds to FIG. 13. In FIG. 14, the rotatable bracket 108 is shown, with its rotatable fastener 110 located midway between the perimeter edge 107 and the center of the search coil 106, along its longitudinal axis. The orientation of the rotatable bracket 108 is illustrated in the operational position in FIG. 14. The position of the bracket 108 in the storage position is shown by phantom lines 109, and also includes the arc of rotation 111 of the bracket 108. In addition, suitable latches 114 are provided to retain the rotatable bracket 108 in either of the storage or operational positions. In this view, there are two latches 114 illustrated, which serve to retain the rotatable bracket 108 at the desired positions. Note that the latches are shown schematically in this view. Those skilled in the art will appreciated that various latch mechanisms could be employed and that both locations may not be required. A single latch could be employed, for example. The latches need not engage the rotatable bracket 108, but could also engages other components of the assembly.

Figure 15:
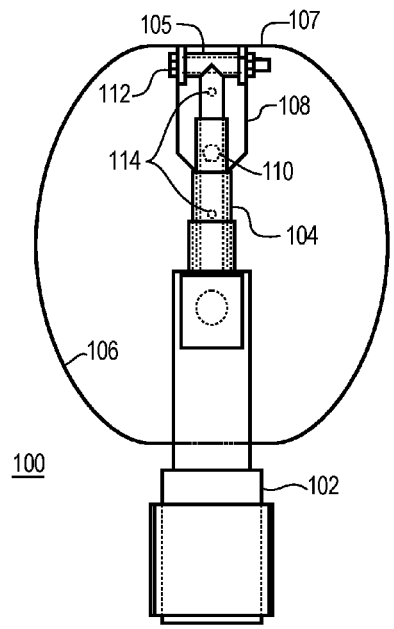
FIG. 15 is a top view drawing of a folded ground search metal detector according to an illustrative embodiment of the present invention.
Figure 16:
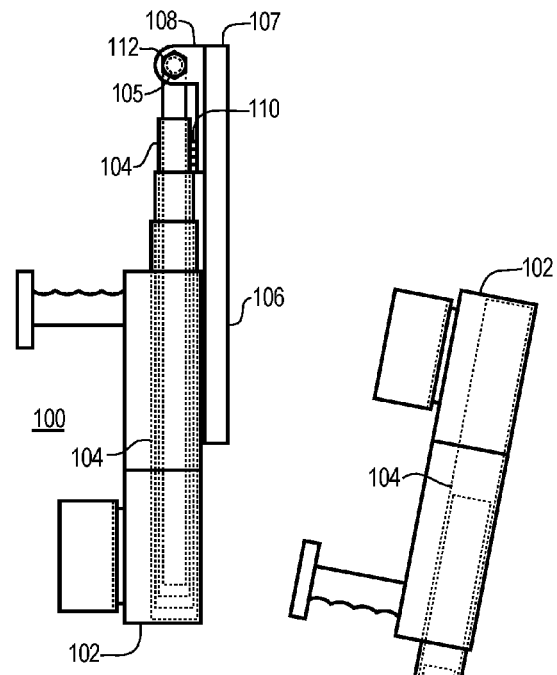
FIG. 16 is a side view drawing of a folded ground search metal detector according to an illustrative embodiment of the present invention.
Figure 17:
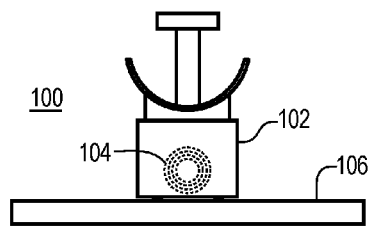
FIG. 17 is an end view drawing of a folded ground search metal detector according to an illustrative embodiment of the present invention.

Reference is directed to FIGS. 15, 16, and 17, which are top view, side view, and end view drawings, respectively, of a folded ground search metal detector 100 according to an illustrative embodiment of the present invention. In these views, the rotatable bracket 108 has been rotated to locate the connector 105 and the distal end of the stem 104 to be adjacent to the perimeter edge 107 of the search coil 106. The stem 104 has also been fully collapsed. Note that the axis of rotation of the rotatable bracket 108 is perpendicular to the substantially planar search coil 106.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A metal detector apparatus, comprising:
a stem having a connector located at a distal end thereof;
a search coil having a generally planar configuration that defines a perimeter edge, and with a central portion located away from said perimeter edge;
a mount, disposed between said search coil and said connector, that pivotally engages and selectively locates said connector at a storage position or an operational position, and wherein said operational position is located adjacent to said central portion, thereby facilitating balanced distribution of forces applied to said search coil with respect to said stem, and wherein
said storage position locates said connector adjacent to said perimeter edge to facilitate compact storage of the metal detector by pivoting said stem to overlap said search coil.

2. The apparatus of claim 1, and wherein:
said stem is collapsible, thereby reducing the overall size of the metal detector for storage.

3. The apparatus of claim 1, and wherein:
said stem is telescopic.

4. The apparatus of claim 1, and wherein:
said mount is an integral fixture of said search coil.

5. The apparatus of claim 1, and wherein:
said mount removably engages said search coil.

6. The apparatus of claim 1, and further comprising:
a brake disposed between said mount and said connector, thereby enabling selective control of the degree to force required to pivot said connector with respect to said search coil.

7. The apparatus of claim 1, and further comprising:
a latch disposed between said mount and said connector, and arranged to fixedly retain said connector at either of said operational position or said storage position.

8. The apparatus of claim 1, and further comprising:
a control cable extending to said search coil, and wherein
said control cable is routed along said stem and said mount to accommodate transitions between said operational position to said storage position.

9. The apparatus of claim 8, and wherein:
said cable is disposed within said stem.

10. The apparatus of claim 8, and wherein:
said cable is wrapped about the exterior of said stem.

11. The apparatus of claim 1, and wherein:
said mount is a clevis mount and said connector is a clevis knuckle.

12. The apparatus of claim 1, and wherein:
said mount is a clevis mount and said connector is a clevis knuckle, said clevis mount having a slot opening to engage a clevis pin passing through said clevis knuckle, and wherein said slot opening ends define said operational position and said storage position.

13. The apparatus of claim 12, and wherein:
said mount further includes a recess formed about said slot opening and aligned to retain said clevis knuckle in either of said operational position or said storage position.

14. The apparatus of claim 1, and wherein:
said mount is rotatably coupled to said search coil about an axis of rotation, and wherein rotation of said mount with respect to said search coil transitions said connector between said operational position and said storage position.

15. The apparatus of claim 14, and further comprising:
a latch disposed to fixedly locate said rotatably coupled mount at either of said operational position or said storage position.

16. The apparatus of claim 14, and wherein:
said axis of rotation is oriented parallel to said substantially planar search coil.

17. The apparatus of claim 14, and wherein:
said axis of rotation is oriented perpendicular to said substantially planar search coil.

18. A metal detector apparatus, comprising:
a stem having a connector located at a distal end thereof;

a search coil having a generally planar configuration that defines a perimeter edge and a longitudinal axis;

a mount, disposed between said search coil and said connector, that pivotally engages and selectively locates said connector at a first position or a second position, and wherein said first position locates said connector adjacent to said perimeter edge to facilitate compact storage of the metal detector by pivoting said stem to overlap substantially the entire length of said search coil longitudinal axis, and said second position locates said connector proximate to the center of said search coil longitudinal axis.

19. The apparatus of claim 18, and wherein:

said mount removably engages said search coil.

20. The apparatus of claim 18, and further comprising:

a brake disposed between said mount and said connector, thereby enabling selective control of the degree to force required to pivot said connector with respect to said search coil.

21. The apparatus of claim 18, and further comprising:

a latch disposed between said mount and said search coil, and arranged to fixedly retain said connector at either of said first position or said second position.

22. The apparatus of claim 18, and wherein:

said mount is a clevis mount and said connector is a clevis knuckle.

23. The apparatus of claim 18, and wherein:

said mount is a clevis mount and said connector is a clevis knuckle, said clevis mount having a slot opening to engage a clevis pin passing through said clevis knuckle, and wherein said slot opening ends define said first position and said second position.

24. The apparatus of claim 23, and wherein:

said mount further includes a recess formed about said slot opening and aligned to retain said clevis knuckle in either of said first position or said second position.

25. The apparatus of claim 18, and wherein:

said mount is rotatably coupled to said search coil about an axis of rotation, and wherein rotation of said mount with respect to said search coil transitions said connector between said first position and said second position.

26. The apparatus of claim 25, and further comprising:

a latch disposed to fixedly locate said rotatably coupled mount at either of said first position or said second position.

27. The apparatus of claim 25, and wherein:

said axis of rotation is oriented parallel to said substantially planar search coil.

28. The apparatus of claim 25, and wherein:

said axis of rotation is oriented perpendicular to said substantially planar search coil.

* * * * *